(12) United States Patent
Ju et al.

(10) Patent No.: US 10,648,894 B2
(45) Date of Patent: May 12, 2020

(54) METHOD FOR MEASURING DYNAMIC STRESS FIELD EVOLUTION LAW OF COMPLEX HETEROGENEOUS STRUCTURE

(71) Applicant: CHINA UNIVERSITY OF MINING AND TECHNOLOGY, BEIJING, Beijing (CN)

(72) Inventors: Yang Ju, Beijing (CN); Zhangyu Ren, Beijing (CN); Li Wang, Beijing (CN); Lingtao Mao, Beijing (CN); Hongbin Liu, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 16/477,850

(22) PCT Filed: Mar. 23, 2018

(86) PCT No.: PCT/CN2018/080201
§ 371 (c)(1),
(2) Date: Jul. 12, 2019

(87) PCT Pub. No.: WO2018/219027
PCT Pub. Date: Dec. 6, 2018

(65) Prior Publication Data
US 2019/0368988 A1    Dec. 5, 2019

(30) Foreign Application Priority Data

May 27, 2017    (CN) .......................... 2017 1 0392707

(51) Int. Cl.
*G06T 7/00*    (2017.01)
*G01N 3/06*    (2006.01)
(Continued)

(52) U.S. Cl.
CPC ........... *G01N 3/068* (2013.01); *B29C 64/386* (2017.08); *B33Y 50/00* (2014.12); *G06T 7/0004* (2013.01);
(Continued)

(58) Field of Classification Search
None
See application file for complete search history.

(56) References Cited

U.S. PATENT DOCUMENTS 4,668,086 A * 5/1987 Redner .................. G01B 11/18
356/327
4,914,487 A * 4/1990 Croizer .................. G01L 1/241
356/35

(Continued)

FOREIGN PATENT DOCUMENTS

| CN | 100427930 C | 10/2008 |
| CN | 101320003 A | 12/2008 |

(Continued)

OTHER PUBLICATIONS

Ajovalasit, A., Sandro Barone, and G. Petrucci. "A review of automated methods for the collection and analysis of photoelastic data." The Journal of Strain Analysis for Engineering Design 33, No. 2 (1998): 75-91. (Year: 1998).*

(Continued)

*Primary Examiner* — Carol Wang
(74) *Attorney, Agent, or Firm* — Yue (Robert) Xu; Apex Attorneys at Law, LLP

(57) ABSTRACT

A method for measuring the dynamic stress field evolution law of a complex heterogeneous structure, comprising: preparing a transparent photosensitive resin model of a complex heterogeneous structure by means of three-dimensional (3D) printing technology to serve as a test piece (S101); placing the test piece in a light path of a circularly (Continued)

polarized light dark field, performing continuous stress loading on the test piece, and recording images (S102); acquiring a plurality of continuously changing full-field stress fringe grayscale images according to videos generated by the image recording (S103); then acquiring grayscale value change sequences of pixel points at each position in the images (S104); and finally, calculating full-field fringe orders under continuous loading conditions according to the relation between the grayscale values and the fringe orders so as to calculate full-field stress values under the continuous loading conditions (S105). Thus, it is possible to extract and quantify the global dynamic stress field evolution law of a complex heterogeneous structure subjected to high exterior load under fixed light field conditions.

20 Claims, 6 Drawing Sheets

(51) Int. Cl.
  *B33Y 50/00* (2015.01)
  *B29C 64/386* (2017.01)
  *B33Y 70/00* (2020.01)
  *B33Y 80/00* (2015.01)
  *B29L 31/40* (2006.01)

(52) U.S. Cl.
  CPC ... *B29K 2995/0026* (2013.01); *B29L 2031/40* (2013.01); *B33Y 70/00* (2014.12); *B33Y 80/00* (2014.12); *G01N 2203/0647* (2013.01); *G06T 2207/30108* (2013.01)

(56) References Cited

U.S. PATENT DOCUMENTS

| | | | | |
|---|---|---|---|---|
| 5,400,131 | A | * | 3/1995 | Stockley .................. G01L 1/241 356/33 |
| 6,055,053 | A | * | 4/2000 | Lesniak .................. G01L 1/241 356/34 |
| 2007/0017296 | A1 | | 1/2007 | Huang et al. |

FOREIGN PATENT DOCUMENTS

| | | |
|---|---|---|
| CN | 103968979 A | 8/2014 |
| CN | 105181458 A | 12/2015 |
| CN | 106599348 A | 4/2017 |
| CN | 107144525 A | 9/2017 |

OTHER PUBLICATIONS

Baig, Iqbal, K. Ramesh, and M. P. Hariprasad. "Analysis of stress distribution in dry masonry walls using three fringe photoelasticity." In International Conference on Experimental Mechanics 2014, vol. 9302, p. 93022P. International Society for Optics and Photonics, 2015. (Year: 2015).*

Chang, C. W., H. S. Lien, and J. H. Lin. "Determination of reflection photoelasticity fringes analysis with digital image-discrete processing." Measurement 41, No. 8 (2008): 862-869. (Year: 2008).*

Chen, Terry Y. "Digital photoelasticity." In Photomechanics, pp. 197-232. Springer, Berlin, Heidelberg, 2000. (Year: 2000).*

Voloshin, Arkady S., and C. P. Burger. "Half-fringe photoelasticity: a new approach to whole-field stress analysis." Experimental Mechanics 23, No. 3 (1983): 304-313. (Year: 1983).* de León, Juan Carlos Briñez, Alejandro Restrepo Martínez, and John W. Branch Bedoya. "High stress concentration analysis using RGB intensity changes in dynamic photoelasticity videos." In 2016 XXI Symposium on Signal Processing, Images and Artificial Vision (STSIVA), pp. 1-7. IEEE, 2016. (Year: 2016).*

Micro-Measurements, Vishay. Introduction to Stress Analysis by the PhotoStress® Method. vol. 22005. Vishay Tech Note TN-702, 2005. (Year: 2005).*

Ajovalasit, A., G. Petrucci, and M. Scafidi. "Photoelastic analysis of edge residual stresses in glass by automated "test fringes" methods." Experimental mechanics 52, No. 8 (2012): 1057-1066. (Year: 2012).*

Junior, Antonio Francisco Gentil Ferreira, and Oswaldo Horikawa. "Photoelastic fringe pattern analysis by image processing." COBEM 2005: proceedings (2005). (Year: 2005).*

Ajovalasit, A., Sandro Barone, and G9 Petrucci. "Towards RGB photoelasticity: full-field automated photoelasticity in white light." Experimental Mechanics 35, No. 3 (1995): 193-200. (Year: 1995).*

International Search Report for PCT/CN2018/080201 dated May 30, 2018, ISA/CN.

CNIPA First Office Action corresponding to Application No. 201710392707.5; dated Feb. 28, 2019.

Yang Ju, et al.,Visualization of the complex structure and stress field inside rock by means of 3D printing technology, Science China Press, Aug. 1, 2014, pp. 3019-3119, vol. 59 No. 32.

Sangyi Li, et al., A Fringe Gray Level Method for Photoelastic Stress Analysis, Journal of Applied Mechanics, Jun. 30, 1986, pp. 67-74, vol. 3 No. 2.

* cited by examiner

METHOD FOR MEASURING DYNAMIC STRESS FIELD EVOLUTION LAW OF COMPLEX HETEROGENEOUS STRUCTURE

The present application is the US national phase of International Application No. PCT/CN2018/080201 filed on Mar. 23, 2018, which claims priority to Chinese Patent Application No. 201710392707.5, titled "METHOD FOR MEASURING DYNAMIC STRESS FIELD EVOLUTION IN COMPLEX HETEROGENEOUS STRUCTURE", filed on May 27, 2017 with the China National Intellectual Property Administration, the disclosures of which are incorporated herein by reference in their entirety.

FIELD

The present disclosure relates to the technical field of stress measurement, in particular to a method for measuring the evolution of a dynamic stress field in a complex heterogeneous structure.

BACKGROUND

It is a goal pursued in the long-time by many scientists and engineers in the engineering field to accurately and intuitively display and present stress field evolution of complex heterogeneous materials such as rock and concrete, as well as engineering structures, which is also a basis and key to solving many engineering practical problems.

The existing stress field measurement methods mainly include two types, experimental measurement and numerical simulation. The experimental measurement mainly involves methods such as on-site monitoring and laboratory measurement, which mainly rely on sensors to measure local points, have difficulty in forming full-field stress distribution, and have a large cost on measurement. Although the numerical simulation can better show stress field distribution, its computational accuracy is subject to material parameters, model meshing, and boundary condition settings.

There is also a relatively mature full-field stress measurement method in the conventional technology, that is, photoelasticity, which generally quantifies the distribution of the stress field by determining the number of fringe orders. However, such experimental method is limited to the processing of models with simple geometric shapes. For models with non-continuous structures embedded with pores, cracks and particles, the distribution characteristics of the photoelastic fringes are abnormally complex and thus traditional quantification method hardly applies; and even the digital photoelastic method developed in recent years cannot realize the extraction and quantification of the full-field stress when the complex structure is subjected to high external loads continuously applied under fixed light field conditions.

SUMMARY

A measurement method for the evolution of a dynamic stress field in a complex heterogeneous structure is provided in the present disclosure, so as to solve the problem that the existing digital photoelastic method cannot realize the extraction and quantification of a global stress field in a case that the complex structure is subjected to high external loads continuously applied under fixed light field conditions.

To achieve the above objective, the following technical solutions are provided according to the present disclosure.

A method for measuring the evolution of a dynamic stress field in a complex heterogeneous structure is provided, which includes:
manufacturing a transparent photosensitive resin model of a complex heterogeneous structure by 3D printing, to serve as a test piece;
placing the test piece in an optical path of a dark-field circularly polarized light, performing continuous stress loading on the test piece and recording the test piece;
obtaining multiple full-field stress fringe grayscale images which are continuous, based on a video generated by the recording;
obtaining a sequence of gray values of a pixel at each position in the images based on the multiple full-field stress fringe grayscale images which are continuous; and
calculating a full-field fringe order under a continuous loading condition, according to a relationship between gray value and fringe order and sequences of gray values of all pixels in the images, and then calculating a full-field stress value under the continuous loading condition.

Preferably, the manufacturing the transparent photosensitive resin model of the complex heterogeneous structure by 3D printing includes: obtaining an internal complex pore structure of the complex heterogeneous structure by CT scanning; digitally reconstructing the internal complex pore structure to generate a digital model; and importing the digital model into a 3D printer, and printing the transparent photosensitive resin model.

Preferably, the placing the test piece in the optical path of the dark-field circularly polarized light, performing continuous stress loading on the test piece and recording the test piece includes: placing the test piece in the optical path of the dark-field circularly polarized light, performing continuous stress loading on the test piece by a stress loading apparatus, and recording a whole process of change of a full-field stress fringe in the test piece by a high-definition digital video camera.

Preferably, the obtaining the multiple full-field stress fringe grayscale images which are continuous, based on the video generated by the recording includes: converting, at a rate of 10 frames per second (depending on change of fringes in practice), the video generated by the recording into multiple pictures which are continuous; and performing image processing on the multiple pictures, to obtain the multiple full-field stress fringe grayscale images.

Preferably, the obtaining the sequence of gray values of the pixel at each position in the images based on the multiple full-field stress fringe grayscale images which are continuous includes: extracting gray values of each pixel at a same position in the multiple full-field stress fringe grayscale images which are continuous, to form the sequence of gray values of each pixel.

Preferably, the calculating the full-field stress fringe order under the continuous loading condition includes: calculating an integer part and a decimal part of a fringe order of a pixel at each position.

Preferably, the calculating the integer part of the fringe order of the pixel at each position includes: converting the sequence of gray values of the pixel at each position into a curve of change; calculating an average of peaks and troughs in the curve of change; and obtaining the integer part of the fringe order of the pixel at a corresponding position based on the number of troughs below the average.

Preferably, the calculating the decimal part of the fringe order of the pixel at each position includes: calculating the decimal part of the fringe order of the pixel at each position according to a cosine function $y=I_b+I_a(1-\cos\theta)$ between the curve y of change and a wrapped phase difference θ, where $I_b$ is an intensity of a background light during test, $I_a$ is an intensity of a light source, θ is the wrapped phase difference which meets θ=2πx, and x is the decimal part of the fringe order, where the cosine function is determined based on a last peak and a last trough in a curve of light intensity change calculated at a pixel under a certain load.

Preferably, the calculating the full-field stress value under the continuous loading condition includes: multiplying the full-field fringe order by an optical fringe constant, to obtain the full-field stress value.

In the method for measuring the evolution of a dynamic stress field in a complex heterogeneous structure according to the present disclosure, a transparent photosensitive resin model of a complex heterogeneous structure is manufactured by 3D printing, to serve as a test piece; the test piece is placed in an optical path of a dark-field circularly polarized light, continuous stress loading and video recording are performed on the test piece; multiple full-field stress fringe grayscale images which are continuous are obtained based on a video generated by the video recording; a sequence of gray values of a pixel at each position in the images is obtained based on the multiple full-field stress fringe grayscale images which are continuous; and a full-field fringe order under a continuous loading condition is calculated according to a relationship between gray value and fringe order and sequences of gray values of all pixels in the images, and then a full-field stress value under the continuous loading condition is calculated based on the full-field fringe order. Thus, the method can realize the extraction and quantification of the evolution of the full-field stress in a case that a complex structure is subjected to high external loads under fixed light field conditions.

BRIEF DESCRIPTION OF THE DRAWINGS

For clearer illustration of the technical solutions according to embodiments of the present disclosure or conventional technology, the drawings involved in description of the embodiments according to the present disclosure or conventional technology are briefly described hereinafter. Apparently, the drawings in the following descriptions only illustrate some embodiments of the present disclosure, and other drawings may be obtained by those skilled in the art based on the drawings without any inventive efforts.

DETAILED DESCRIPTION

Hereinafter the technical solutions according to the embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any inventive effort fall within the scope of protection of the present disclosure.

A method for measuring the evolution of a dynamic stress field in a complex heterogeneous structure is provided according to the present disclosure, so as to solve the problem that the existing digital photoelastic method cannot realize the extraction and quantification of the full-field stress in a case that a complex structure is subjected to high external loads continuously applied under fixed light field conditions.

Figure 1:
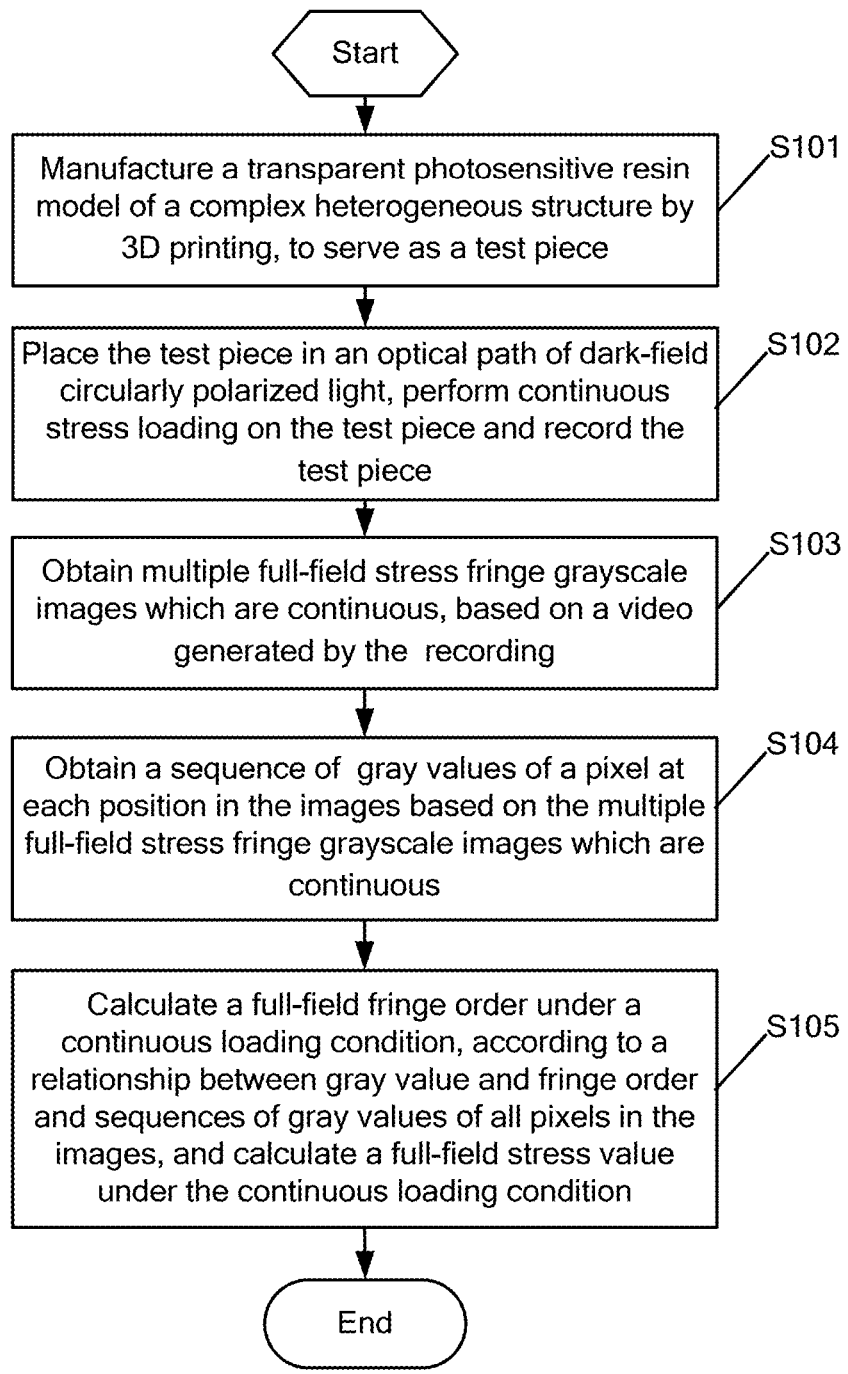
FIG. 1 is a flow chart of a method for measuring the evolution of a dynamic stress field in a complex heterogeneous structure according to an embodiment of the present disclosure.

In an embodiment, the method for measuring the evolution of a dynamic stress field in a complex heterogeneous structure includes the following steps S101 to S105, as shown in FIG. 1.

In S101, a transparent photosensitive resin model of a complex heterogeneous structure is manufactured by 3D printing, to serve as a test piece.

Figure 2:
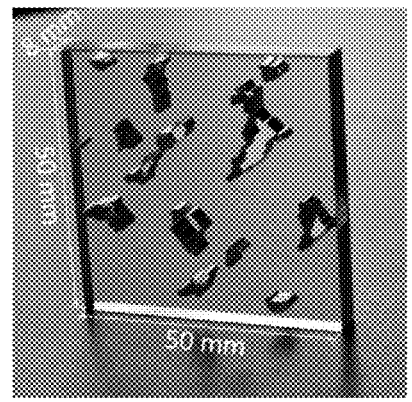
FIG. 2 is a schematic structural view of a transparent photosensitive resin model of a complex heterogeneous structure according to an embodiment of the present disclosure.

In practice, the test piece is printed with a VeroClear material through 3D printing technology, and the obtained test piece is shown in FIG. 2.

In S102, the test piece is placed in an optical path of a dark-field circularly polarized light, and continuous stress loading and video recording are performed on the test piece;

In an embodiment, the optical path of the dark-field circularly polarized light may be formed by a monochromatic light source; or the optical path of the dark-field circularly polarized light may be formed by a white light source, but in this case, a monochromatic optical filter needs to be provided in front of a lens of a video camera.

The dynamic changing process of a stress field can be obtained through the continuous stress loading on the test piece. The entire changing process of a full-field stress fringe can be captured and recorded by video recording.

In S103, multiple full-field stress fringe grayscale images which are continuous are obtained based on a video generated by the video recording.

Image extraction is performed on the video, where the shorter the time interval for the extraction is, the more images can be obtained and the more accurate and detailed the changing process of the stress field is. The specific time interval may be determined according to the specific application scenarios and is not specifically limited herein, which under all circumstances falls within the protection scope of the present disclosure.

In S104, a sequence of gray values of a pixel at each position in the images is obtained based on the multiple full-field stress fringe grayscale images which are continuous.

The gray value of a pixel at a certain position represents its light intensity.

In S105, a full-field fringe order under a continuous loading condition is calculated according to a relationship between gray value and fringe order and sequences of gray values of all pixels in the images, and then a full-field stress value under the continuous loading condition is calculated based on the full-field fringe order.

Since the transparent photosensitive resin model is used as the test piece, and the test piece is placed in the optical path of the dark-field circularly polarized light, the light intensity of a pixel at a certain position has a specific relationship with the fringe order of the pixel at the position and such relationship is applicable to all pixels at respective positions. Thus, the full-field fringe order under continuous loading conditions can be calculated.

Preferably, the full-field fringe order is multiplied by the material stress optical value of 38.6 N/mm/fringe, to obtain the full-field stress value.

Figure 3A:
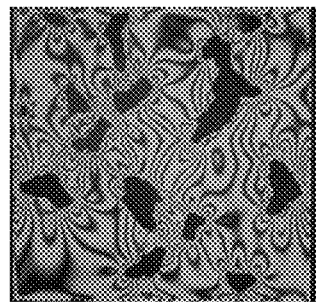
FIG. 3*a* is photoelastic fringe pattern of a dynamic stress field in a heterogeneous structure according to an embodiment of the present disclosure.
Figure 3B:
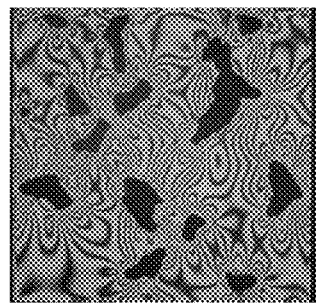
FIG. 3*b* is a photoelastic fringe pattern of a dynamic stress field in a heterogeneous structure according to an embodiment of the present disclosure.
Figure 3C:
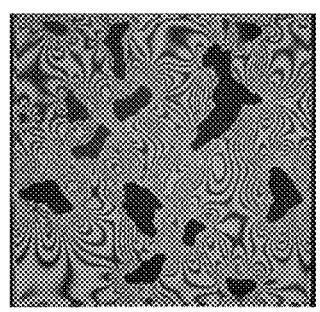
FIG. 3*c* is a photoelastic fringe pattern of a dynamic stress field in a heterogeneous structure according to an embodiment of the present disclosure.

FIG. 3 shows a photoelastic fringe pattern of the dynamic stress field in the heterogeneous structure, which is obtained by the method for measuring the evolution of a dynamic stress field in a complex heterogeneous structure. FIG. 3a is a photoelastic fringe pattern of a dynamic stress field at a pressure of 5 kN, FIG. 3b is a photoelastic fringe pattern of a stress field at a pressure of 7 kN, and FIG. 3c is a photoelastic fringe pattern of a stress field at a pressure of 9 kN.

Figure 4A:
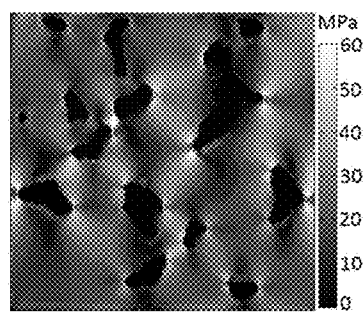
FIG. 4*a* is a schematic diagram of a quantized dynamic stress field in a heterogeneous structure according to an embodiment of the present disclosure.
Figure 4B:
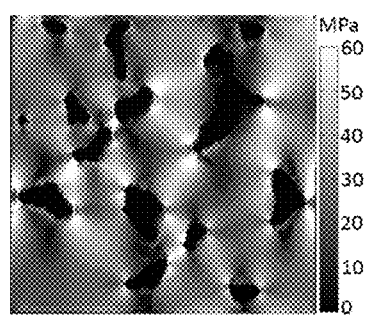
FIG. 4*b* is a schematic diagram of a quantized dynamic stress field in a heterogeneous structure according to an embodiment of the present disclosure.
Figure 4C:
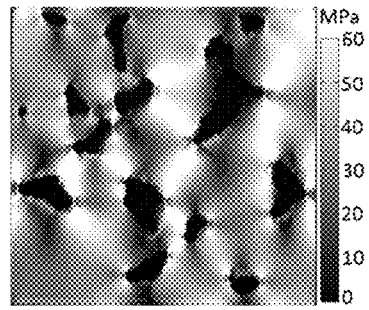
FIG. 4*c* is a schematic diagram of a quantized dynamic stress field in a heterogeneous structure according to an embodiment of the present disclosure.

FIG. 4 shows a quantized dynamic stress field in the heterogeneous structure obtained by the method for measuring the evolution of a dynamic stress field in a complex heterogeneous structure. FIG. 4a shows a stress field at a pressure of 5 kN, FIG. 4b shows a stress field at a pressure of 7 kN, and FIG. 4c shows a stress field at a pressure of 9 kN.

The method for measuring the evolution of a dynamic stress field in a complex heterogeneous structure according to the embodiments can quickly determine a full-field fringe order according to a law of change of pixel light intensity, based on digital images obtained by continuously applying stress on a heterogeneous structure under a fixed light field condition. Therefore the method can realize the extraction and quantification of the evolution of a global dynamic stress field in a case that a complex structure is subjected to high external loads under fixed light field conditions. The method has good applicability to complex non-continuous structures and dynamic stress fields, and also has characteristics such as simple experimental operation, strong repeatability and high quantification accuracy of stress field, which is of great significance for promoting and broadening the practical application of photoelastic measurement technology.

Figure 5:
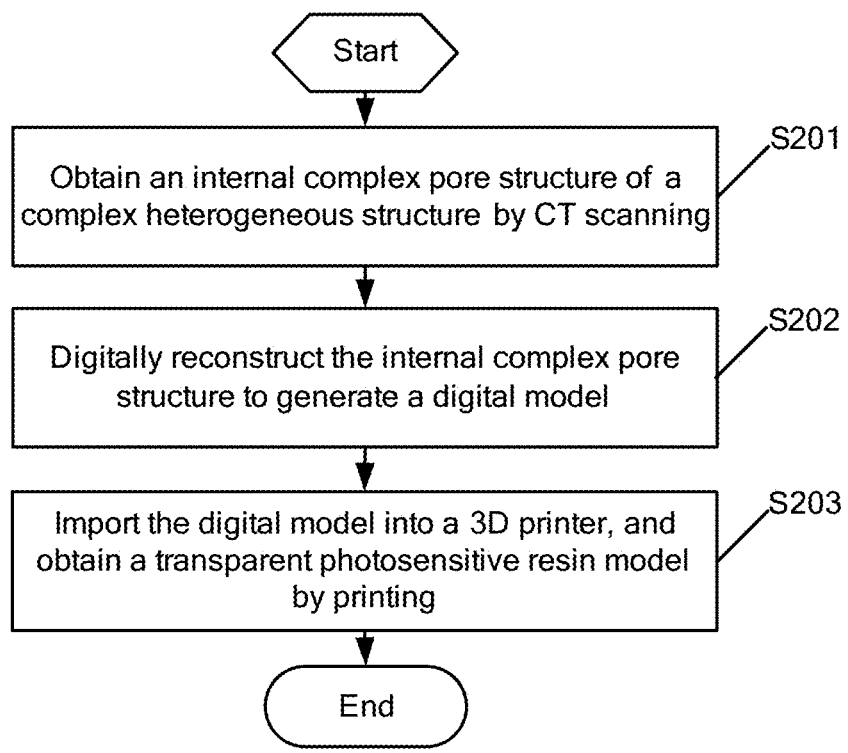
FIG. 5 is a partial flow chart of a method for measuring the evolution of a dynamic stress field in a complex heterogeneous structure according to an embodiment of the present disclosure.

A method for measuring the evolution of a dynamic stress field in a complex heterogeneous structure is provided according to another embodiment of the present disclosure based on the above embodiment and FIG. 1. Preferably, as shown in FIG. 5, step S101 includes steps S201 to S203.

In S201, an internal complex pore structure of the complex heterogeneous structure is obtained by CT scanning.

In S202, the internal complex pore structure is digitally reconstructed, to generate a digital model.

In S203, the digital model is imported into a 3D printer, to print the transparent photosensitive resin model.

In an embodiment, the complex heterogeneous structure, such as sandstone cores, is scanned by industrial CT, to obtain an internal complex pore structure thereof, then part of the internal complex pore structure is selected for digital reconstruction according to practical application scenarios, to generate a digital model, and then the digital model is imported into a 3D printer, to print the test piece shown in FIG. 2 by using a VeroClear material.

Preferably, step S102 includes:

placing the test piece in the optical path of the dark-field circularly polarized light, performing continuous stress loading on the test piece by a stress loading apparatus, and recording a whole process of change of a full-field stress fringe in the test piece by a high-definition digital video camera.

In an embodiment, the stress loading apparatus may be a single-axis testing machine or any other loading apparatus, and a loading rate may be 0.5 mm/min, which is not specifically limited herein and may be determined according to specific application scenarios, which under all circumstances falls within the protection scope of the present disclosure.

In addition, the high-definition digital video camera may be SONY HDR-SR12E with a dynamic resolution of 1440× 1080, which is not limited herein and may be determined according to specific application scenarios, which under all circumstances falls within the protection scope of the present disclosure.

Figure 6:
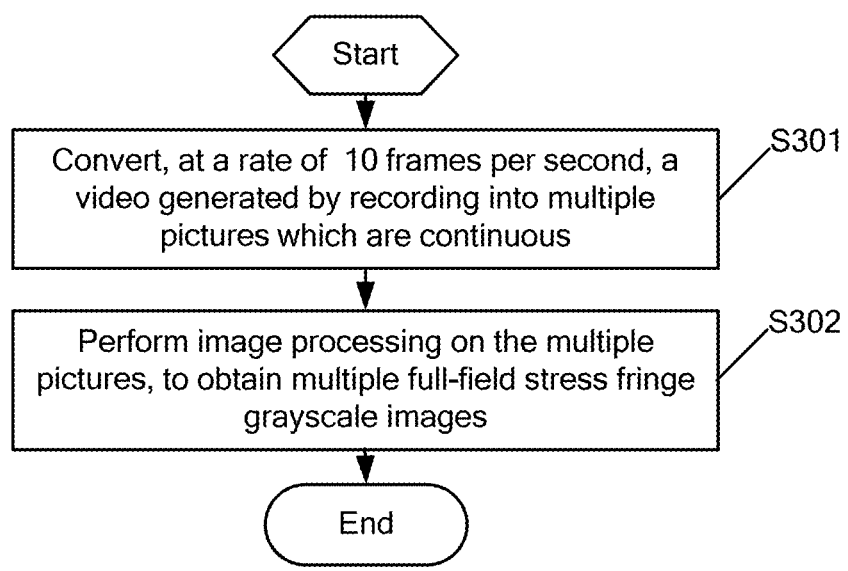
FIG. 6 is a partial flow chart of a method for measuring the evolution of a dynamic stress field in a complex heterogeneous structure according to an embodiment of the present disclosure.

Preferably, as shown in FIG. 6, step S103 includes steps S301 and S302.

In S301, the video generated by the video recording is converted at a rate of 10 frames per second into multiple pictures which are continuous.

In S302, image processing is performed on the multiple pictures, to obtain the multiple full-field stress fringe grayscale images.

In specific practical application, 4500 images may be obtained by video capture, which is merely an example and does not limit the present disclosure in any form.

The image processing includes, but is not limited to, a series of processing operations such as median filtering, threshold segmentation, artifact processing, and grayscale processing, which is not specifically limited herein and may be determined according to specific application scenarios as long as the full-field stress fringe grayscale image acquired is clear, which under all circumstances falls within the protection scope of the present disclosure.

Preferably, step S104 includes:

extracting gray values of each pixel at a same position in the multiple full-field stress fringe grayscale images which are continuous, to form the sequence of gray values of each pixel.

In an embodiment, the gray values of each pixel at the same position in the multiple full-field stress fringe grayscale images which are continuous, that is, the light intensity, are extracted to form a continuous sequence, and the sequence reflects the change in light intensity of the pixel at the same position during the continuous loading process, that is, the change in the fringe order.

Preferably, step S105 includes:

calculating an integer part and a decimal part of a fringe order of a pixel at each position.

In an embodiment, calculating the integer part of the fringe order of the pixel at each position includes: converting the sequence of gray values of the pixel at each position into a curve of change; calculating an average of peaks and troughs in the curve of change; and obtaining the integer portion of the fringe order of the pixel at a corresponding position based on the number of troughs below the average.

In an embodiment, a curve of light intensity change over a loading time is generated, and filtering processing is performed thereon to obtain a relatively smooth curve. Then, with reference to a straight line close to the average of the peaks and the troughs, the curve is converted into a fluctuation curve of which the number of peaks and troughs can be accurately determined. That is, in the curve of continuous light intensity change, points above the average are provided with one larger value, and points below the average is provided with one smaller value. In this manner, the curve of light intensity is converted into a stepped fluctuation curve, and the number of peaks and the number of troughs can be directly determined by fluctuation characteristics. Then, the integer part of the fringe order can be directly determined according to the number of the troughs.

In addition, calculating the decimal part of the fringe order of the pixel at each position includes:

calculating the decimal part of the fringe order of the pixel at each position according to a cosine function $y=I_b+I_a(1-\cos\theta)$ between the curve y of change and a wrapped phase difference $\theta$, wherein $I_b$ is an intensity of a background light during test, $I_a$ is an intensity of a light source, $\theta$ is the wrapped phase difference, $\theta=2\pi x$, and x is the decimal part of the fringe order, where the cosine function is determined based on a last peak and a last trough in the curve of light intensity change calculated at a pixel under a certain load. Analysis can be performed on the curve of light intensity change to determine changing characteristics of the cosine function, because the curve y of light intensity change represents a cosine function of optical path difference, and a decimal part of the optical path difference divided by $2\pi$ is the decimal part x of the fringe order. In this way, the remaining section of the fringe order, that is, the decimal part of the fringe order, can be calculated according to an inverse cosine function.

The rest of the operation principle is the same as the above embodiment, and is not described herein.

The embodiments according to the present disclosure are described in a progressive manner, where each embodiment lays emphasis on differences from other embodiments and for the same or similar parts between various embodiments, one may refer to the description of other embodiments. The apparatuses according to the embodiments of the present disclosure are only briefly described for they correspond to the methods according to the embodiments, and reference may be made to the method descriptions for related parts.

The foregoing embodiments are only some preferred embodiments of the present disclosure, and do not limit the present disclosure in any form. The preferred embodiments according to the disclosure are disclosed above, but are not intended to limit the present disclosure. With the method and technical content disclosed above, those skilled in the art can make numerous variations and improvements to the technical solutions of the present disclosure, or make some equivalent variations on the embodiments without departing from the scope of technical solutions of the present disclosure. Therefore, all simple modifications, equivalent variations and improvements made based on the technical essence of the present disclosure without departing from the content of the technical solutions of the present disclosure fall within the protection scope of the technical solutions of the present disclosure.

The invention claimed is:

1. A method for measuring the evolution of a dynamic stress field in a complex heterogeneous structure, comprising:
    manufacturing a transparent photosensitive resin model of a complex heterogeneous structure by 3D printing, to serve as a test piece;
    placing the test piece in an optical path of dark-field circularly polarized light, performing continuous stress loading on the test piece and recording the test piece;
    obtaining a plurality of full-field stress fringe grayscale images that are continuous, based on a video generated by the recording;
    obtaining a sequence of gray values of a pixel at each position in the plurality of full-field stress fringe grayscale images based on the plurality of full-field stress fringe grayscale images that are continuous; and
    calculating a full-field fringe order under a continuous loading condition, according to a relationship between gray value and fringe order and sequences of gray values of all pixels in the plurality of full-field stress fringe grayscale images, and calculating a full-field stress value under the continuous loading condition.

2. The method for measuring the evolution of a dynamic stress field in a complex heterogeneous structure according to claim 1, wherein the manufacturing the transparent photosensitive resin model of the complex heterogeneous structure by 3D printing comprises:
    obtaining an internal complex pore structure of the complex heterogeneous structure by computed tomography (CT) scanning;
    digitally reconstructing the internal complex pore structure to generate a digital model; and
    importing the digital model into a 3D printer, and obtaining the transparent photosensitive resin model by printing.

3. The method for measuring the evolution of a dynamic stress field in a complex heterogeneous structure according to claim 2, wherein the calculating the full-field fringe order under the continuous loading condition comprises:
    calculating an integer part and a decimal part of a fringe order of a pixel at each position.

4. The method for measuring the evolution of a dynamic stress field in a complex heterogeneous structure according to claim 3, wherein the calculating the integer part of the fringe order of the pixel at each position comprises:
    converting the sequence of gray values of the pixel at each position into a curve of change;
    calculating an average of peaks and troughs in the curve of change; and
    obtaining the integer portion of the fringe order of the pixel at a corresponding position based on a number of troughs below the average.

5. The method for measuring the evolution of a dynamic stress field in a complex heterogeneous structure according to claim 2, wherein the calculating the full-field stress value under the continuous loading condition comprises:
    multiplying the full-field fringe order by an optical fringe constant, to obtain the full-field stress value.

6. The method for measuring the evolution of a dynamic stress field in a complex heterogeneous structure according to claim 1, wherein the placing the test piece in the optical path of the dark-field circularly polarized light, performing continuous stress loading on the test piece and recording the test piece comprises:

placing the test piece in the optical path of the dark-field circularly polarized light, performing continuous stress loading on the test piece by a stress loading apparatus, and recording a whole process of change of a full-field stress fringe in the test piece by a high-definition digital video camera.

7. The method for measuring the evolution of a dynamic stress field in a complex heterogeneous structure according to claim 6, wherein the calculating the full-field fringe order under the continuous loading condition comprises:

calculating an integer part and a decimal part of a fringe order of a pixel at each position.

8. The method for measuring the evolution of a dynamic stress field in a complex heterogeneous structure according to claim 7, wherein the calculating the integer part of the fringe order of the pixel at each position comprises:

converting the sequence of gray values of the pixel at each position into a curve of change;

calculating an average of peaks and troughs in the curve of change; and obtaining the integer portion of the fringe order of the pixel at a corresponding position based on a number of troughs below the average.

9. The method for measuring the evolution of a dynamic stress field in a complex heterogeneous structure according to claim 8, wherein the calculating the decimal part of the fringe order of the pixel at each position comprises:

calculating the decimal part of the fringe order of the pixel at each position according to a cosine function $y=I_b+I_a(1 \cos \theta)$ between the curve of change and a wrapped phase difference $\theta$, wherein $I_b$ is an intensity of a background light during test, $I_a$ is an intensity of a light source, $\theta$ is the wrapped phase difference meeting $\theta=2\pi x$, and x is the decimal part of the fringe order, wherein the cosine function is determined based on a last peak and a last trough in a curve of light intensity change calculated at a pixel under a certain load.

10. The method for measuring the evolution of a dynamic stress field in a complex heterogeneous structure according to claim 6, wherein the calculating the full-field stress value under the continuous loading condition comprises:

multiplying the full-field fringe order by an optical fringe constant, to obtain the full-field stress value.

11. The method for measuring the evolution of a dynamic stress field in a complex heterogeneous structure according to claim 1, wherein the obtaining the plurality of full-field stress fringe grayscale images that are continuous, based on the video generated by the recording comprises:

converting, at a rate of 10 frames per second, the video generated by the recording into a plurality of pictures that are continuous; and performing image processing on the plurality of pictures, to obtain the plurality of full-field stress fringe grayscale images.

12. The method for measuring the evolution of a dynamic stress field in a complex heterogeneous structure according to claim 11, wherein the calculating the full-field fringe order under the continuous loading condition comprises:

calculating an integer part and a decimal part of a fringe order of a pixel at each position.

13. The method for measuring the evolution of a dynamic stress field in a complex heterogeneous structure according to claim 11, wherein the calculating the full-field stress value under the continuous loading condition comprises:

multiplying the full-field fringe order by an optical fringe constant, to obtain the full-field stress value.

14. The method for measuring the evolution of a dynamic stress field in a complex heterogeneous structure according to claim 1, wherein the obtaining the sequence of gray values of the pixel at each position in the plurality of full-field stress fringe grayscale images based on the plurality of full-field stress fringe grayscale images that are continuous comprises:

extracting gray values of each pixel at a same position in the plurality of full-field stress fringe grayscale images that are continuous, to form the sequence of gray values of each pixel.

15. The method for measuring the evolution of a dynamic stress field in a complex heterogeneous structure according to claim 14, wherein the calculating the full-field fringe order under the continuous loading condition comprises:

calculating an integer part and a decimal part of a fringe order of a pixel at each position.

16. The method for measuring the evolution of a dynamic stress field in a complex heterogeneous structure according to claim 14, wherein the calculating the full-field stress value under the continuous loading condition comprises:

multiplying the full-field fringe order by an optical fringe constant, to obtain the full-field stress value.

17. The method for measuring the evolution of a dynamic stress field in a complex heterogeneous structure according to claim 1, wherein the calculating the full-field fringe order under the continuous loading condition comprises:

calculating an integer part and a decimal part of a fringe order of a pixel at each position.

18. The method for measuring the evolution of a dynamic stress field in a complex heterogeneous structure according to claim 17, wherein the calculating the integer part of the fringe order of the pixel at each position comprises:

converting the sequence of gray values of the pixel at each position into a curve of change;

calculating an average of peaks and troughs in the curve of change; and obtaining the integer portion of the fringe order of the pixel at a corresponding position based on a number of troughs below the average.

19. The method for measuring the evolution of a dynamic stress field in a complex heterogeneous structure according to claim 18, wherein the calculating the decimal part of the fringe order of the pixel at each position comprises:

calculating the decimal part of the fringe order of the pixel at each position according to a cosine function $y=I_b+I_a(1-\cos \theta)$ between the curve of change and a wrapped phase difference $\theta$, wherein $I_b$ is an intensity of a background light during test, $I_a$ is an intensity of a light source, $\theta$ is the wrapped phase difference meeting $\theta=2\pi x$, and x is the decimal part of the fringe order, wherein the cosine function is determined based on a last peak and a last trough in a curve of light intensity change calculated at a pixel under a certain load.

20. The method for measuring the evolution of a dynamic stress field in a complex heterogeneous structure according to claim 1, wherein the calculating the full-field stress value under the continuous loading condition comprises:

multiplying the full-field fringe order by an optical fringe constant, to obtain the full-field stress value.

* * * * *